(12) United States Patent
Kurasawa et al.

(10) Patent No.: US 11,858,072 B2
(45) Date of Patent: Jan. 2, 2024

(54) FLUX, FLUX-CORED SOLDER USING FLUX, FLUX-COATED SOLDER USING FLUX AND SOLDERING METHOD

(71) Applicant: SENJU METAL INDUSTRY CO., LTD., Tokyo (JP)

(72) Inventors: Yoko Kurasawa, Tokyo (JP); Hiroaki Iseki, Tokyo (JP); Kenta Nakajima, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/623,668

(22) PCT Filed: Feb. 1, 2021

(86) PCT No.: PCT/JP2021/003465
§ 371 (c)(1),
(2) Date: Dec. 29, 2021

(87) PCT Pub. No.: WO2021/199645
PCT Pub. Date: Oct. 7, 2021

(65) Prior Publication Data
US 2022/0203483 A1 Jun. 30, 2022

(30) Foreign Application Priority Data
Mar. 30, 2020 (JP) .................. 2020-059856

(51) Int. Cl.
*B23K 35/36* (2006.01)
*B23K 35/362* (2006.01)
*B23K 35/365* (2006.01)
*B23K 35/368* (2006.01)

(52) U.S. Cl.
CPC ........ *B23K 35/3613* (2013.01); *B23K 35/362* (2013.01); *B23K 35/365* (2013.01); *B23K 35/368* (2013.01)

(58) Field of Classification Search
CPC ................................................. B23K 35/3613
See application file for complete search history.

(56) References Cited

U.S. PATENT DOCUMENTS

| 10,265,808 B2 | 4/2019 | Onitsuka et al. |
| 2014/0130940 A1 | 5/2014 | Okada |
| 2016/0184937 A1 | 6/2016 | Onitsuka et al. |
| 2017/0282304 A1 | 10/2017 | Ichikawa et al. |

FOREIGN PATENT DOCUMENTS

| CN | 102689114 B | 11/2014 | |
| CN | 104191108 B | 3/2016 | |
| CN | 108213772 A | 6/2018 | |
| CN | 108687463 A | * 10/2018 | ......... B23K 35/3613 |
| DE | 10 2018 112 982 A1 | 12/2019 | |
| JP | 7-185882 A | 7/1995 | |
| JP | 2016-120507 A | 7/2016 | |
| JP | 2017-192987 A | 10/2017 | |
| JP | 2018-167297 A | 11/2018 | |
| JP | 6638839 B1 | 1/2020 | |

OTHER PUBLICATIONS

International Search Report dated Apr. 20, 2021, issued in counterpart International Application No. PCT/JP2021/003465 (2 pages).
Notice of Reasons for Refusal dated Jul. 14, 2020, issued in counterpart JP Patent Application No. 2020-059856, w/ English translation (6 pages).
Decision to Grant a Patent dated Oct. 13, 2020, issued in counterpart JP Patent Application No. 2020-059856, w/ English translation (5 pages).
"Soldering Materials", Electronic Materials Business, Harima Chemicals Group, <https://www.harima.eo.jp/products/electronics/solder.html>, retrieved on Aug. 30, 2023 (5 pages).
"Solda Paste", JIS Z 3284, 1994, <https://kikakurui.com/z3/Z3284-1994-01.html>, Retrieved on Aug. 31, 2023 (35 pages).
"Solder paste for ultra-high-density mounting dispensing", S3X70-M500D, <https://www.ko-ki.co.jp/products/detail/47/>, KOKI Corporation, retrieved on Aug. 30, 2023. (2 pages).
"SS Paste Series", <https://www.senju.com/ja/products/sparkle_solder/paste/ss-series.php>, Senju Metal Industry, retrieved on Aug. 30, 2023. (2 pages).
"TLF-801-17 In-based low melting point solder paste", <https://www.tamura-ss.co.jp/jp/products/electronic_chemicals/category/soldapaste/tlf_801_17.html>, TAMURA Corporation, retrieved on Aug. 30, 2023. (2 pages).
Extended European Search Report dated Dec. 23, 2022, issued in counterpart European Application No. 21780324.6-1103 /4000793 of PCT/JP2021/003465 with English translation. (8 pages).

* cited by examiner

*Primary Examiner* — Jophy S. Koshy
*Assistant Examiner* — Joshua S Carpenter
(74) *Attorney, Agent, or Firm* — WHDA, LLP

(57) ABSTRACT

A flux according to the present invention contains a rosin methyl ester in which the flux is a solid or solid-like flux at 25° C., and is used for an inside of a flux-cored solder or an exterior of a flux-coated solder.

15 Claims, No Drawings

FLUX, FLUX-CORED SOLDER USING FLUX, FLUX-COATED SOLDER USING FLUX AND SOLDERING METHOD

TECHNICAL FIELD

The present invention relates to a flux, a flux-cored solder using the flux, a flux-coated solder using the flux, and a soldering method. More specifically, the flux is used for an inside of the flux-cored solder or an exterior of the flux-coated solder.

BACKGROUND ART

A rosin contained in a flux contains a resin acid, which is so-called abietic acid, as a main component. Such an acid (carboxylic acid) has a main function of improving wettability by removing an oxide film on a surface of a conductor at the time of soldering, preventing oxidation of a solder joint, or lowering a surface tension of a solder.

On the other hand, the flux also contains components that are not decomposed or evaporated by heating during soldering in order to secure the above function. These components remain around a soldered portion after soldering, which are so-called flux residues. When the soldered portion is cleaned after soldering, the flux residues are removed, but when the soldered portion cannot be cleaned, the flux residues will remain. Then, if vibration is applied to the flux residues during transportation after soldering or during assembly of components, the flux residues may be cracked or peeled off. As a result, the peeled flux residues adhere to a place where it should not be present, which may cause defects.

For example, Patent Document 1 discloses a paste-like solder composition containing a hydrogenated acid-modified rosin, a hydrogenated rosin ester, solder powders, and the like. In addition, Patent Document 2 discloses a flux for a flux-cored solder containing a rosin ester and an activator, from the viewpoint of suppressing white smoke during soldering.

RELATED DOCUMENT

Patent Document

[Patent Document 1] Japanese Unexamined patent publication NO. 2018-167297
[Patent Document 2] Japanese Unexamined patent publication NO. 2016-120507

SUMMARY OF THE INVENTION

As a form of soldering, a wire, a ball, a powder, a pellet, a preform, a rod-like material, a lump, and the like are known. However, the flux of the present invention focuses on applications to a flux-cored solder filled with the flux and a flux-coated solder coated with the flux in advance.

The technique described in Patent Document 1 is a technique relating to the paste-like solder composition obtained by mixing the powdered solders and the flux, and is designed so that flux fluidity can be obtained at room temperature. Thus, processing into the flux-cored solder or the flux-coated solder is difficult. That is, processability suitable for the application to the present invention was not obtained.

Further, the technique described in Patent Document 2 focuses on suppressing white smoke during soldering, and there is room for improvement in crackability of the flux residue.

The present inventors have conducted intensive studies on the premise that the flux is a solid or solid-like flux at 25° C. in order to obtain a flux suitable for an application to the inside of the flux-cored solder or the exterior of the flux-coated solder. As a result, the present inventors found that by using a rosin methyl ester among rosin esters, it is possible to suppress the crackability of the flux residue while maintaining the function of the flux in the related art.

According to the present invention, there is provided a flux containing a rosin methyl ester, in which the flux is a solid or solid-like flux at 25° C., and is used for an inside of a flux-cored solder or an exterior of a flux-coated solder.

Further, according to the present invention, there is provided a flux-cored solder containing the flux inside thereof.

Further, according to the present invention, there is provided a flux-coated solder using the flux for an exterior thereof.

Further, according to the present invention, there is provided a soldering method including performing soldering with the flux.

According to the present invention, it is possible to provide a flux suitable for an application to an inside of a flux-cored solder or an exterior of a flux-coated solder and capable of suppressing crackability of a flux residue.

DESCRIPTION OF EMBODIMENTS

Hereinafter, embodiments of the present invention will be described in detail.

The term "substantially" used herein means to include a range in consideration of manufacturing tolerances, assembly variations, and the like, unless otherwise explicitly described. The expression "a to b" used herein for the description of the numerical range means a or more and b or less unless otherwise specified. For example, "1% to 5% by mass" means "1% by mass or more and 5% by mass or less". In the present specification, a content of c with respect to a total mass of d means the content of c in 100% by mass of d.

<Flux>

A flux according to the present embodiment contains a rosin methyl ester in which the flux is a solid or solid-like flux at 25° C., and is used for an inside of a flux-cored solder or an exterior of a flux-coated solder. Accordingly, it is possible to suppress crackability of a flux residue while maintaining a function of the flux in the related art. In particular, it is possible to effectively suppress cracking of the flux residue due to physical impact during transportation or the like.

[Component]

Hereinafter, each component contained in the flux will be described.

The flux of the present embodiment contains a rosin methyl ester (a).

The rosin methyl ester (a) means a methyl ester product obtained by esterifying resin acid forming rosin with a methyl alcohol. Although the rosin methyl ester (a) is a liquid at 25° C., it has high compatibility with the rosin and is difficult to volatilize, and therefore, the rosin methyl ester (a) remains in the flux residue of the flux containing the rosin methyl ester (a). As a result, an effect of suppressing occurrence of cracks in the flux residue can be obtained. Since the rosin methyl ester (a) is a rosin modified product, it is also excellent in that it does not adversely affect properties necessary for the flux such as wettability.

Examples of the resin acid forming rosin obtained by a rosin methyl esterification can include dihydroabietic acid, tetrahydroabietic acid, and dehydroabietic acid, in addition to abietic acid.

In addition, examples of the rosin as a raw material can include a raw material rosin such as a gum rosin, a wood rosin, and a tall oil rosin, and a derivative obtained from the raw material rosin. Examples of the derivative can include a purified rosin, a hydrogenated rosin, a disproportionated rosin, a polymerized rosin, and an α, β unsaturated carboxylic acid-modified product (an acrylated rosin, a maleated rosin, a fumarated rosin, or the like), as well as a purified product of the polymerized rosin, a hydride, and a disproportionated product, and a purified product of the α, β unsaturated carboxylic acid-modified product, a hydride, and a disproportionated product. The derivative can be used alone or in combination of two or more.

Among them, the hydrogenated rosin is preferably used.

Examples of commercially available a hydrogenated rosin methyl ester can include "Foralyn 5020-F" (produced by Eastman Chemical Company) and "M-HDR" (produced by MARUZEN CHEMICAL TRADING CO., LTD).

A content of the rosin methyl ester (a) is preferably 0.5% to 20% by mass, and more preferably 3.0% to 18% by mass with respect to the total mass of the flux of the present embodiment.

When the content of the rosin methyl ester (a) is equal to or less than the upper limit described above, it is easy to suppress occurrence of cracks in the flux residue while maintaining the wettability. On the other hand, when the content of the rosin methyl ester (a) is equal to or more than the lower limit described above, it is easy to process for applications to the inside of the flux-cored solder or the exterior of the flux-coated solder.

According to the findings of the present inventors, when only a rosin (b) esterified with alcohols other than methyl alcohol is used, the cracks cannot be efficiently suppressed from occurring in the flux residue because the flux is not a liquid due to the excessively large molecular weight of the esterified rosin.

However, the flux of the present embodiment may contain the rosin (b) esterified with alcohols other than methyl alcohol. In this case, a content of the rosin (b) esterified with alcohols other than methyl alcohol is, for example, preferably 0.1% to 30% by mass, and more preferably 1% to 20% by mass with respect to the total mass of the flux of the present embodiment.

The flux of the present embodiment may further contain an unesterified rosin (c), that is, nonesterified rosin. As a result, the solid or solid-like flux can be easily obtained and the processability of the flux-cored solder and flux-coated solder can be improved, and furthermore, the effect of suppressing occurrence of cracks in the flux residue can be obtained while maintaining the wettability of the rosin methyl ester (a).

The content (mass) of the rosin methyl ester (a) with respect to a content (mass) of the unesterified rosin (c) is, for example, preferably 0.01 or more, and more preferably 0.02 or more from the viewpoint of obtaining stable crackability of the residue. On the other hand, the upper limit of the content of the rosin methyl ester (a) with respect to the content of the unesterified rosin (c) is not particularly limited, but is preferably 0.5 or less, for example.

The unesterified rosin (c) means a rosin obtained by not esterifying resin acid forming rosin, and examples of the rosin can include rosin used for the above-described rosin methyl ester (a).

The content of the unesterified rosin (c) is preferably 40% to 98.9% by mass, and more preferably 50% to 97.0% by mass with respect to the total mass of the flux of the present embodiment.

When the content of the unesterified rosin (c) is equal to or less than the upper limit described above, it is easy to process for applications to the inside of the flux-cored solder or the exterior of the flux-coated solder. On the other hand, when the content of the unesterified rosin (c) is equal to or more than the lower limit described above, it is easy to suppress occurrence of cracks in the flux residue.

The flux of the present embodiment may further contain a resin other than the rosin resin.

Examples of the resin other than the rosin resin can include one or two or more kinds selected from a terpene resin, a modified terpene resin, a terpene phenol resin, a modified terpene phenol resin, a styrene resin, a modified styrene resin, a xylene resin, and modified xylene resin.

As the modified terpene resin, an aromatic-modified terpene resin, a hydrogenated terpene resin, a hydrogenated aromatic-modified terpene resin, and the like can be used. As the modified terpene phenol resin, a hydrogenated terpene phenol resin, and the like can be used. As the modified styrene resin, a styrene acrylic resin, a styrene-maleic acid resin, and the like can be used. As the modified xylene resin, a phenol-modified xylene resin, an alkylphenol-modified xylene resin, a phenol-modified resol-type xylene resin, a polyol-modified xylene resin, a polyoxyethylene-added xylene resin, and the like can be used.

The flux of the present embodiment may further contain an activator in addition to the resin in order to improve solderability.

As the activator, an organic acid activator, an amine activator, an amine hydrohalogonic acid salt activator, an organic halogen compound activator, and the like can be used.

As the organic acid activator, adipic acid, azelaic acid, eicosandioic acid, citric acid, glycolic acid, succinic acid, salicylic acid, diglycolic acid, dipicolinic acid, dibutylaniline diglycolic acid, suberic acid, sebacic acid, thioglycol acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis (hydroxymethyl)propionic acid, 2,2-bis (hydrozymethyl) butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, linolenic acid, dimer acid, hydrogenated dimer acid, trimer acid, hydrogenated trimer acid, and the like can be used.

As the amine activator, an aliphatic amine, an aromatic amine, an amino alcohol, an imidazole, a benzotriazole, an amino acid, a guanidine, a hydrazide, and the like can be used.

Examples of the aliphatic amine can include dimethylamine, ethyiamine, l-aminopropane, isopropylamine, trimethylamine, allylamine, n-butylamine, diethylamine, sec-butylamine, tert-butylamine, N,N-dimethylethylamine, isobutylamine, and cyclohexylamine.

Examples of the aromatic amine can include aniline, N-methylaniline, diphenylamine, N-isopropylaniline, and p-isopropylamine. Examples of the amino alcohol can include 2-aminoethanol, 2-(ethylamino)ethanol, diethanolamine, diisopropanolamine, triethanolamine, N-butyldiethanolamine, triisopropanolamine, N,N-bis(2-hydroxyethyl)-N-cyclohexylamine, N,N,N', N'-tetrakis-(2-hydroxypropyl)ethylenediamine, and N,N,N',N",N"-pentakis (2-hydroxypropyl) diethylenetriamine.

Examples of the imidazole can include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazineisocyanuric acid adduct, a 2-phenylimidazoleisocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, a 2,4-diamino-6-vinyl-s-triazineisocyanuric acid adduct, 2,4-diamino-6-methacryloyloxyethyl-s-triazine, an epoxyimidazole adduct, 2-methylbenzimidazole, 2-octylbenzimidazole, 2-pentylbenzoimidazole, 2-(1-ethylpentyl)benzimidazole, 2-nonylbenzimidazole, 2-(4-thiazolyl)benzimidazole, and benzimidazole.

Examples of the benzotriazole can include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3', 5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazole-1-yl)methyl]imino]bisethanol, a 1,2,3-benzotriazole sodium salt aqueous solution, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazole-1-yl)methyl]-4-methylphenol, and 5-methylbenzotriazole.

Examples of the amino acid can include alanine, arginine. asparagine, aspartic acid, cysteine hydrochloride, glutamine, glutamic acid, glycine, histidine, isoleucine, leucine, lysine monohydrochloride, methionine, phenylalanine, proline, serine, threonine, tryptophan, tyrosine, valine, β-alanine, γ-aminobutyric acid, δ-aminovaieric acid, ε-aminohexanoic acid, ε-caprolactam, and 7-aminoheptanoic acid.

Examples of the guanidine can include carbodihydrazide, malonic acid dihydrazide, succinate dihydrazide, adipic dihydrazide, 1,3-bis(hydrazinocarbonoethyl)-5-isopropylhydrandine, sebacic acid dihydrazide, dodecanedioic acid dihydrazide, 7,11-octadecadien-1,18-dicarbohydrazide, and isophthalic dihydrazide.

Examples of the hydrazide can include dicyandiamide, 1,3-diphenylguanidine, and 1,3-di-o-tolylguanidine.

As the amine hydrohalogenic acid salt activator, a hydrohalogenic acid salt (salt, of HF, HCl, KBr, or HI) of the amine compound described above as the amine activator can be used.

Examples of the amine hydrohalogenic acid salt can include stearylamine hydrochloride, diethylaniline hydrochloride, diethanolaraine hydrochloride, 2-ethylhezylamine hydrobromide, pyridine hydrobromide, isopropylamine hydrobromide, cyciohexylamine hydrobromide, diethylamine hydrobromide, monoethylamine hydrobromide, 1,3-diphenylguanidine hydrobromide dimethylamine hydrobromide, dimethylamine hydrochloride, rosinamine hydrobromide, 2-ethylhexylamine hydrochloride, isopropylamine hydrochloride, cyclohexylamine hydrochloride, 2-pipecholine hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diailylamine hydrobromide, monoethylamine hydrochloride, monoethylamine hydrobromide, diethylamine hydrochloride, trietnylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylaraine hydrochloride, dodecylamine hydrochloride, dimethylcyclohexylamine hydrobromide, ethylenediamine dihydrobromide, rosinamine hydrobromide, 2-phenylimidazole hydrobromide, 4-benzylpyridine hydrobromate, L-glutamic acid hydrochloride, N-methylmorpholine hydrochloride, betaine hydrochloride, 2-pipecholine hydroiodide, cyclohexylamine hydroiodide, 1,3-diphenylguanidine hydrofluorate, diethylamine hydrofluorate, 2-ethylhexylamine hydrofluoride, cyclohexylamine hydrofluoride, ethylamine hydrofluoride, rosinamine hydrofluoride, cyclohexylamine tetrafluoroborate, and dicyclohexylamine tetrafluoroborate.

As the organic halogen compound activator, trans-2,3-dibromo-2-butene-1,4-diol, 2,3-dibromo-1,4-butanediol, 2,3-dibromo-1-propanol, 2,3-dichlore-1-propanol, 1,1,2,2-tetrabromoethane, 2,2,2-tribromoethanol, pentabromoethane, carbon tetrabromide, 2,2-bis(bromomethyl)-1,3-propanediol, meso-2,3-Dibromo-succinic, chloroalkane, a chlorinated fatty acid ester, n-hexadecyltrimethylammonium bromide, triallyl isocyanurate hexabromide, 2,2-bis[3,5-dibromo-4-[2,3-dibromopropoxy)phenyl]propane, bis(3,5-dibromo-4-(2,3-dibromopropoxy)phenyl]sulfone, ethylenebispentabroraobenzene, 2-chloromethyloxirane, HET acid, HET anhydride, brominated bisphenol A epoxy resin, and the like can be used.

A content of the activator is, for example, preferably 0.1% to 40% by mass, and more preferably 1% to 30% by mass with respect to the total mass of the flux of the present embodiment. When the content of the activator is equal to or less than the upper limit described above, it is possible to suppress corrosion of the flux residue after soldering, reduction in insulation resistance, and the like. On the other hand, when the content of the activator is equal to or more than the lower limit described above, wettability and antioxidant performance can be obtained.

As for the content of each activator with respect to the total mass of the flux of the present embodiment, for example, the organic acid activator is preferably 0% to 30% by mass, the amine activator is preferably 0% to 10% by mass, and the total amount of the amine hydrohalogenic acid salt activator and the organic halogen compound activator is preferably 0% to 20% by mass, respectively.

The flux of the present embodiment can further contain one or two or more kinds selected from a solvent, a phosphoric ester, a silicone, and a surfactant.

As the solvent, various glycol ether solvents and the like, for example, phenyl glycol, hexylene glycol, hexyl diglycol, and the like can be used.

A content of the solvent is, for example, preferably 0% to 13% by mass, and more preferably 0% to 10% by mass with respect to the total mass of the flux of the present embodiment. When the content of the solvent is equal to or less than the upper limit described above, good processability is obtained.

As the phosphoric ester, methyl acid phosphate, ethyl acid phosphate, isopropyl acid phosphate, monobutyl acid phosphate, butyl acid phosphate, dibutyl acid phosphate, butoxyethyl acid phosphate, 2-ethylhexyl acid phosphate, bis(2-ethylhexyl)phosphate, monoisodecyl acid phosphate, isodecyl acid phosphate, lauryl acid phosphate, isotridecyl acid phosphate, stearyl acid phosphate, oleyl acid phosphate, beef tallow phosphate, coconut oil phosphate, isostearyl acid phosphate, alkyl acid phosphate, tetracosyl acid phosphate, ethyleneglycol acid phosphate, 2-hydroxyethyl methacrylate acid phosphate, dibutyl pyrophosphate acid phosphate, mono-2-ethylhexyl (2-Ethylhexyl)phosphonate, an alkyl (alkyl)phosphonate, and the like can be used.

A content of the phosphoric ester is, for example, preferably 0% to 10% by mass, and more preferably 0% to 2% by mass with respect to the total mass of the flux of the present embodiment. When the content of the phosphoric ester is equal to or less the upper limit described above, good processability is exerted.

As the silicone, a dimethyl silicone oil, a cyclic silicone oil, a methylphenyl silicone oil, a methyl hydrogen silicone oil, a higher fatty acid-modified silicone oil, an alkyl-modified silicone oil, an alkyl-aralkyl-modified silicone oil, an amino-modified silicone oil, an epoxy-modified silicone oil, a polyether-modified silicone oil, an alkyl polyether-modified silicone oil, a carbinol-modified silicone oil, and the like can be used.

A content of the silicone is, for example, preferably 0% to 10% by mass, and more preferably 0% to 2% by mass with respect to the total mass of the flux of the present embodiment. When the content of the silicone is equal to or less than the upper limit described above, good processability is exerted.

As the surfactant, a polyoxyalkylene alkylamine, a polyoxyethylene alkylamine, a polyoxypropylene alkylamine, a polyoxyethylene polyoxypropylene alkylamine, a polyoxyalkylene alkylamide, a polyoxyethylene alkylamide, a polyoxypropylene alkylamide, a polyoxyethylene polyoxypropylene alkylamide, a polyoxyalkylene alkyl ether, a polyoxyethylene alkyl ether, a polyoxypropylene alkyl ether, a polyoxyethylene polyoxypropylene alkyl ether, a polyoxyalkylene alkyl ester, a polyoxyethylene alkyl ester, a polyoxypropylene alkyl ester, a polyoxyethylene polyoxypropylene alkyl ester, a polyoxyalkylene glyceryl ether, polyoxyethylene glyceryl ether, polyoxypropylene glyceryl ether, polyoxyethylene polyoxypropylene glyceryl ether, a polyoxyalkylene diglyceryl ether, polyoxyethylene diglyceryl ether, polyoxypropylene diglyceryl ether, polyoxyethylene polyoxypropylene diglyceryl ether, a polyoxyalkylene polyglyceryl ether, polyoxyethylene polyglyceryl ether, polyoxypropylene polyglyceryl ether, polyoxyethylene polyoxypropylene polyglyceryl ether, a glycerin fatty acid ester, a diglycerin fatty acid ester, a polyglycerin fatty acid ester, a sorbitan fatty acid ester, a sucrose fatty acid ester, and the like can be used.

A content of the surfactant is, for example, preferably 0% to 5% by mass with respect to the total mass of the flux of the present embodiment. When the content of the surfactant is equal to or less than the upper limit described above, an effect of improving detergency is exerted without impairing solderability.

[Property]

The flux of the present embodiment is a solid or solid-like flux at 25° C. That is, the solid or solid-like flux means that it has no fluidity when left on a horizontal plane at 25° C. under atmospheric pressure.

In addition, the solid-like flux includes a flux in which a part thereof has fluidity by applying a physical stress from the outside at 25° C. Specifically, a viscosity of the solid-like flux measured with a rheometer as described later may be defined as a viscosity $\eta_1$ at 25° C. equal to or more than a lower limit as described later.

On the other hand, for example, the flux naturally having fluidity or deformed due to its own weight without applying the stress from the outside does not correspond to the solid or solid-like flux at 25° C., the flux being left on the horizontal at 25° C. Specifically, when a sample, which is prepared into a columnar shape (diameter: φ5 mm, height: 5 mm, and weight: about 0.1 g) using the flux, naturally has fluidity or is deformed on the horizontal plane at 25° C. under atmospheric pressure without applying the physical stress from the outside, it may be determined that the flux does not correspond to the solid or solid-like flux.

When the flux according to the present embodiment is a solid or solid-like flux at 25° C., good processability is obtained, and the flux is provided to be suitable for the application to the inside of the flux-cored solder or the exterior of the flux-coated solder.

In order to make the flux of the present embodiment solid or solid-like at 25° C., the solid or solid-like flux can be obtained by a known method such as adding a solid resin in addition to the rosin methyl ester, controlling the amount of solvent, or using the additive, can be used.

The flux of the present embodiment has a softening point of, for example, preferably 28° C. to 100° C., and more preferably 30° C. to 90° C. When a melting point of the flux is equal to or more than the lower limit described above, good processability is obtained, and the flux suitable for the application to the inside of the flux-cored solder or the exterior of the flux-coated solder is obtained. On the other hand, the upper limit of the melting point of the flux is not particularly limited, but for example, the flux can be easily prepared by setting the melting point of the flux to be equal to or lower than the above upper limit.

The melting point of the flux can be measured based on the measurement of the softening point of JIS K 5902-1969.

The flux of the present embodiment has a viscosity $\eta_1$ at 25° C. of, for example, preferably 3,200 Pa·s or higher, and more preferably 3,500 Pa·s or higher, the viscosity $\eta_1$ at 25° C. being measured 5 minutes after the start of rotation at 6 Hz using a rheometer. When the viscosity $\eta_1$ is equal to or more than the lower limit described above, good processability is obtained. In addition, since the higher the viscosity %, the more solid-like the flux, the upper limit thereof is not particularly limited.

As the rheometer, for example, Thermo Scientific HAAKE MARS III (registered trademark) can be used.

A rheometer having parallel flat plates without grooves on surfaces thereof is used.

A flux sample is sandwiched between the parallel flat plates and deformed to narrow a space between the parallel flat plates while heating about 100° C., thereby forming a thin sample of about 0.5 mm.

As for the thin sample after stopping the heating and cooling it to 25° C., the viscosity $\eta_1$ at 25° C., which is measured 5 minutes after the start of rotation at 6 Hz, is measured using the rheometer.

[Application]

The flux of the present embodiment is provided for the application to the inside of the flux-cored solder or the exterior of the flux-coated solder. That is, the flux of the present embodiment is used to coat an outer surface of a solder alloy filled into a solder alloy or molded into a predetermined shape. The solder in which the flux is filled into the solder alloy is also called a "cored solder".

Therefore, as the flux of the present embodiment, the solid or solid-like flux at 25° C. is required in terms of processability. If the flux is in a liquid state, it is difficult to process the flux-cored solder or the flux-coated solder (process the flux-cored solder or the flux-coated solder to an arbitrary size and shape).

[Preparation and Processing Method of Flux]

The flux of the present embodiment is prepared by heating and mixing a rosin methyl ester and any component by a known method.

In addition, a method of manufacturing the flux-cored solder includes, for example, a step of filling the solder with the above-described flux. An example of the filling method can include a known method such as an extrusion method.

More specifically, in the extrusion method, a raw material is injected into a mold having a large diameter and cooled with cooling water from outside to prepare a mother billet. Thereafter, the mold is reduced to have a smaller diameter (about 50 mmφ) to perform extrusion molding, and the mold is reduced to have a diameter (about 10 mmφ in general) to perform extrusion molding with an extrusion molding machine, such that a linear flux-cored solder can be obtained.

Here, since the flux according to the present embodiment is the solid or solid-like flux at 25° C., it is possible to suppress the flux from being ejected when cooling in an extruding step, thereby obtaining good processability. In other words, if the flux is a liquid at 25° C., when the flux is cooled in the extruding step, the flux is ejected from the solder, resulting in a problem that workers and the like are exposed to danger due to the ejected flux or a manufacturing device of the mother billet or surroundings thereof is contaminated due to the ejected flux. As a result, processing of the flux-cored solder cannot be performed.

Further, the method of manufacturing a flux-coated solder includes, for example, a step of coating a surface of the solder with the above-described flux to form a coating layer (flux-coating layer). Specifically, an example of the coating method can include a known method such as a dipping method.

The flux-cored solder includes a solder alloy and the flux filled into the solder alloy. By way of example, the preferred flux-cored solder may have at least one or two or more core portions formed of the flux at a center portion thereof. Specifically, by way of example, the linear flux-cored solder may have a core formed of the flux at the center or near the center of a wire portion formed of the solder alloy along an axial direction thereof.

The flux-coated solder includes a solder alloy and the flux for coating an outside of the solder alloy. By way of example, the preferred flux-coated solder may have a coating layer formed of the flux and coating at least a part or the entire surface of a core portion formed of the solder alloy. Specifically, a linear flux-coated solder may have a wire portion formed of a solder alloy and a coating layer formed of the flux and coating the entire surface of the wire portion in a circumferential direction.

Examples of shapes of the flux-cored solder and the flux-coated solder can include a columnar shape such as a pellet, a disk, a ring, a chip, a ball, and a cylinder such as a column, in addition to a linear shape.

A composition of the solder alloy can be a known composition of the solder alloy. Specific examples thereof can include a Sn—Ag alloy, a Sn—Cu alloy, a Sn—Ag—Cu alloy, a Sn—In alloy, a Sn—Pb alloy, a Sn—Bi alloy, and a Sn—Ag—Cu—Bi alloy, as well as an alloy obtained by adding Ag, Cu, In, Ni, Co, Sb, Ge, P, Fe, Zn, Ga, or the like to the compositions of the above-described alloys.

Further, the flux-cored solder has a mass ratio of the solder alloy to the flux (solder:flux) is, for example, preferably 99.3:0.2 to 93.5:6.5, and more preferably 98.5:1.5 to 95.5:4.5.

Further, the flux-coated solder has a mass ratio of the solder alloy to the flux (solder:flux) is, for example, preferably 99.7:0.3 to 85:15, and more preferably 99.4:0.6 to 97:3.

Members such as electronic devices can be joined by using the flux-cored solder or flux-coated solder prepared in this way.

The embodiments of the present invention have been described. However, the embodiments are merely examples of the present invention, and various constituents other than the above can be employed. In addition, the present invention is not limited to the abovementioned embodiment, and alterations, improvements, and the like within a scope that can achieve the object of the invention are included in the present invention.

Hereinafter, examples of reference aspects will be additionally described.

1. A flux containing a rosin methyl ester, in which the flux is a solid or solid-like flux at 25° C., and is used for an inside of a flux-cored solder or an exterior of a flux-coated solder.

2. The flux according to 1., in which the rosin methyl ester is one or two or more methyl ester products selected from a natural rosin, a hydrogenated rosin, a polymerized rosin, a disproportionated rosin, an acid-modified rosin, a hydrogenated polymerized rosin, and a hydrogenated acid-modified rosin.

3. The flux according to 1. or 2., in which the flux has a softening point of 28° C. to 100° C.

4. The flux according to any one of 1. to 3., in which the rosin methyl ester is a liquid at 25° C.

5. The flux according to any one of 1. to 4., further containing unesterified rosin.

6. The flux according to 5., in which the content of the rosin methyl ester is 0.01 or more and 0.5 or less with respect to the content of the unesterified rosin.

7. The flux according to any one of 1. to 6., in which a viscosity $\eta_1$ at 25° C. is 3,200 Pa·s or higher, the viscosity $\eta_1$ at 25° C. being measured 5 minutes after a start of rotation at 6 Hz using a rheometer.

8. The flux according to any one of 1. to 7., further containing an activator.

9. The flux according to any one of 1. to 8., in which a content of a solvent is 13% by mass or less.

10. A flux-cored solder containing the flux according to any one of 1. to 9. inside thereof.

11. A flux-coated solder using the flux according to any one of 1. to 9. for an exterior thereof.

12. A soldering method including performing soldering with the flux according to any one of 1. to 9.

13. A method of manufacturing a flux-cored solder including a step of filling a solder with the flux according to any one of 1. to 9.

14. A method of manufacturing a flux-coated solder including a step of coating a surface of a solder with the flux according to any one of 1. to 9. to form a coating layer.

EXAMPLES

Hereinafter, the present invention will be described in detail with reference to Examples, but the present invention is not limited to the description of these Examples.

Examples and Comparative Examples

1) Flux

Each component was mixed in compositions shown in Tables 1 to 4 to obtain a flux. The following measurements and evaluations were performed using the obtained flux.

Measurement of Viscosity

A state of the flux at 25° C. was observed to determine whether or not the flux is a solid or solid-like flux.

Specifically, a person skilled in the art in handling of the flux left a sample of the flux, which is prepared into a columnar shape (diameter: φ5 mm, height: 5 mm, and weight: 0.1 g), on a horizontal plane at an environmental temperature of 25° C. under atmospheric pressure so that a stress is not applied from the outside, and visually observed the presence or absence of rapid fluidity (deformation).

When the flux is not a solid or solid-like flux, the flux was sandwiched between plates of a rheometer (Thermo Scientific HAAKE MAPS III (registered trademark)), and then the plates rotated at 6 Hz, thereby measuring a viscosity η1 measured 5 minutes after the start of the rotation.

Specifically, the following measurement conditions were adopted.

First, a rheometer having parallel flat plates without grooves on surfaces thereof was used.

Subsequently, the flux sample was sandwiched between the parallel flat plates (disposable plates, diameter: 25 mm and model number: KNX2159) and deformed to narrow a space between the parallel flat plates while heating about 100° C., thereby forming a 0.5 mm thin sample.

Thereafter, as for the thin sample after stopping the heating and cooling it to 25° C., the plates rotated at 6 Hz thereby measuring the viscosity η1 at 25° C. which was measured 5 minutes after the start of the rotation at 6 Hz using the rheometer.

A measurement limit was set to 3,500 Pa·s due to a risk of damage to the measuring device.

Measurement of Softening Point

A softening point of the flux was measured according to JIS K 5902 5.3 and evaluated according to the following criteria.

B: 30° C. or higher
D: Lower than 30° C.

2) Flux-Cored Solder and Flux-Coated Solder

Next, a flux-cored solder and a flux-coated solder were prepared using the obtained flux. Each procedure will be described.

Preparation of Flux-Cored Solder (Examples 1 to 46 and Comparative Examples 1 to 4)

The solder having compositions shown in Tables 1 to 4 and a flux-cored solder (diameter: 1.0 mm) were prepared by an extrusion method using the flux described above. Manufacturing was performed so that a mass ratio of a solder alloy to the flux is 97:3. The flux-cored solder of Example 43 (Sn—Bi composition) had an outer diameter of 1.0 mm and a hollow portion (flux part) diameter of 0.38 mm, and the flux-cored solders of other Examples and Comparative Examples had an outer diameter of 1.0 mm and a hollow portion (flux part) diameter of 0.42 mm.

Preparation of Flux-Coated Solder (Example 47)

A wire solder having a diameter of 1.0 mm was prepared using the solder having the compositions shown in Tables 1 to 4, and the flux was coated by a dipping method to prepare a flux-coated solder.

3) Evaluation

The following evaluations were made for the flux-cored solder and the flux-coated solder. The results are shown in Tables 1 to 4.

Processability

In the preparing procedure of 2) described above, processability when preparing the flux-cored solder and the flux-coated solder was evaluated according to criteria shown below.

B: Preparation of the flux-cored solder and the flux-coated solder could be prepared in a safe manner.
D: Processing could not be performed without securing safety because the flux was not a solid or solid-like flux.

Wettability

Wettability was measured according to JIS Z 3197 8.3.1.1 and evaluated according to the following criteria.

<Criteria>
B: 70% or more
D: Less than 70%
Test could not be performed

Crackability of Flux Residue

The flux-cored solder or the flux-coated solder was placed on a center portion of a 0.3 g copper plate (size: 30×30×0.3 mm) and heated to a temperature which is 35° C. higher than a melting point of the solder alloy for 5 seconds to wet spread the solder. Then, the solder was stored at room temperature and cooled to form flux residues on the copper plate, thereby obtaining a sample.

Next, five obtained samples were dropped from 100 cm high, and observation of whether the flux residues were peeled off from the copper plate was performed. Further, all five samples in which no flux residues were peeled off were dropped again from the same height to observe the peeling off of the residues, thereby performing the evaluation according to the following criteria.

A: No residues were peeled off even in the second drop test.
B: No residues were peeled off in the first drop test, but one or more residues were peeled off in the second drop test.
C: One to four residues were peeled off in the first drop test.
D: All five residues were peeled off in the first drop test.
Experiment could not be performed (because it is not possible to manufacture the flux-cored solder)

TABLE 1

|  |  |  | Example 1 | Example 2 | Example 3 | Example 4 |
|---|---|---|---|---|---|---|
| Rosin | (a) | Hydrogenated rosin methyl ester | 5 | 5 | 1 | 3 |
|  | (b) | Rosin ester |  | 5 |  |  |
|  |  | Polymerized rosin ester |  |  | 5 |  |
|  |  | Hydrogenated rosin ester |  |  |  | 5 |
|  | (c) | Natural rosin | 10 |  |  |  |
|  |  | Polymerized rosin | 15 |  |  |  |
|  |  | Hydrogenated rosin | 15 | 73 | 92 | 90 |
|  |  | Acid-modified rosin | 15 |  |  |  |
|  |  | Hydrogenatedpolymerized rosin | 13 |  |  |  |
|  |  | Hydrogenated acid-modified rosin | 10 |  |  |  |
|  |  | Disproportionated rosin | 10 |  |  |  |
| Activator | Organic acid | Glutaric acid |  |  |  |  |
|  |  | Adipic acid | 1 | 1 | 1 | 1 |
|  |  | Stearic acid |  |  |  |  |
|  |  | 12-Hydroxystearic acid |  |  |  |  |
|  | Amine | CUREZOL C11Z (imidazole) |  |  |  |  |
|  |  | 2-Phenylimidazole | 2 | 2 | 2 | 2 |
|  |  | Diphenylguanidine |  |  |  |  |
|  | Amine hydrohalogenic acid salt | 2PI. HBr |  |  |  |  |
|  |  | Diphenylguanidine HBr | 2 | 2 | 2 | 2 |
|  |  | 2-Pipecoline HBr |  |  |  |  |
|  |  | N,N-diethylaniline · HBr salt |  |  |  |  |
|  | Halogen | 2,2,2-Tribromoethanol | 2 | 2 | 2 | 2 |
|  |  | n-DBBD |  |  |  |  |
|  |  | tra-DBBD |  |  |  |  |
|  |  | Tetrabromoethane |  |  |  |  |
|  |  | Tetrabromobutane |  |  |  |  |
|  |  | Triallyl isocyanurate hexabromide |  |  |  |  |
| Others | Solvent | Hexyl diglycol |  |  |  |  |
|  | Silicone | Silicone oil |  |  |  |  |
|  | Polymer | Polyflow No. 90 |  |  |  |  |
|  | Phosphoric ester | (Isodecyl acid phosphate) |  |  |  |  |
|  |  | Total | 100 | 100 | 100 | 100 |
|  |  | (a)/(c) | 0.057 | 0.068 | 0.011 | 0.033 |
| Property |  | Softening point | B | B | B | B |
|  |  | Viscosity (Pa · s) | 3500 | 3500 | 3500 | 3500 |
| Solder processing |  | Solder composition | Sn—Ag—Cu | Sn—Ag—Cu | Sn—Ag—Cu | Sn—Ag—Cu |
| Evaluation |  | Residue crack resistance | A | A | B | A |
|  |  | Processability (suitable for application) | B | B | B | B |
|  |  | Wettability | B | B | B | B |

|  |  |  | Example 5 | Example 6 | Example 7 |
|---|---|---|---|---|---|
| Rosin | (a) | Hydrogenated rosin methyl ester | 5 | 8 | 10 |
|  | (b) | Rosin ester |  |  |  |
|  |  | Polymerized rosin ester |  |  |  |
|  |  | Hydrogenated rosin ester |  |  |  |
|  | (c) | Natural rosin |  |  |  |
|  |  | Polymerized rosin |  |  |  |
|  |  | Hydrogenated rosin | 88 | 85 | 83 |
|  |  | Acid-modified rosin |  |  |  |
|  |  | Hydrogenatedpolymerized rosin |  |  |  |
|  |  | Hydrogenated acid-modified rosin |  |  |  |
|  |  | Disproportionated rosin |  |  |  |
| Activator | Organic acid | Glutaric acid |  |  |  |
|  |  | Adipic acid | 1 | 1 | 1 |
|  |  | Stearic acid |  |  |  |
|  |  | 12-Hydroxystearic acid |  |  |  |
|  | Amine | CUREZOL C11Z (imidazole) |  |  |  |
|  |  | 2-Phenylimidazole | 2 | 2 | 2 |
|  |  | Diphenylguanidine |  |  |  |
|  | Amine hydrohalogenic acid salt | 2PI. HBr |  |  |  |
|  |  | Diphenylguanidine HBr | 2 | 2 | 2 |
|  |  | 2-Pipecoline HBr |  |  |  |
|  |  | N,N-diethylaniline · HBr salt |  |  |  |

TABLE 1-continued

|  |  |  | | | |
|---|---|---|---|---|---|
| Others | Halogen | 2,2,2-Tribromoethanol | 2 | 2 | 2 |
|  |  | n-DBBD | | | |
|  |  | tra-DBBD | | | |
|  |  | Tetrabromoethane | | | |
|  |  | Tetrabromobutane | | | |
|  |  | Triallyl isocyanurate hexabromide | | | |
|  | Solvent | Hexyl diglycol | | | |
|  | Silicone | Silicone oil | | | |
|  | Polymer | Polyflow No. 90 | | | |
|  | Phosphoric ester | (Isodecyl acid phosphate) | | | |
|  |  | Total | 100 | 100 | 100 |
|  |  | (a)/(c) | 0.057 | 0.094 | 0.120 |
| Property |  | Softening point | B | B | B |
|  |  | Viscosity (Pa · s) | 3500 | 3500 | 3500 |
| Solder processing Evaluation |  | Solder composition | Sn—Ag—Cu | Sn—Ag—Cu | Sn—Ag—Cu |
|  |  | Residue crack resistance | A | A | A |
|  |  | Processability (suitable for application) | B | B | B |
|  |  | Wettability | B | B | B |

|  |  |  | Example 8 | Example 9 | Example 10 |
|---|---|---|---|---|---|
| Rosin | (a) | Hydrogenated rosin methyl ester | 15 | 20 | 20 |
|  | (b) | Rosin ester | | | |
|  |  | Polymerized rosin ester | | | |
|  |  | Hydrogenated rosin ester | | | |
|  | (c) | Natural rosin | | | |
|  |  | Polymerized rosin | | | |
|  |  | Hydrogenated rosin | 78 | 73 | 50 |
|  |  | Acid-modified rosin | | | |
|  |  | Hydrogenatedpolymerized rosin | | | |
|  |  | Hydrogenated acid-modified rosin | | | |
|  |  | Disproportionated rosin | | | |
| Activator | Organic acid | Glutaric acid | | | 2 |
|  |  | Adipic acid | 1 | 1 | 2 |
|  |  | Stearic acid | | | 10 |
|  |  | 12-Hydroxystearic acid | | | 10 |
|  | Amine | CUREZOL C11Z (imidazole) | | | 2 |
|  |  | 2-Phenylimidazole | 2 | 2 | |
|  |  | Diphenylguanidine | | | |
|  | Amine hydrohalogenic acid salt | 2PI. HBr | | | |
|  |  | Diphenylguanidine HBr | 2 | 2 | 2 |
|  |  | 2-Pipecoline HBr | | | |
|  |  | N,N-diethylaniline · HBr salt | | | |
|  | Halogen | 2,2,2-Tribromoethanol | 2 | 2 | 2 |
|  |  | n-DBBD | | | |
|  |  | tra-DBBD | | | |
|  |  | Tetrabromoethane | | | |
|  |  | Tetrabromobutane | | | |
|  |  | Triallyl isocyanurate hexabromide | | | |
| Others | Solvent | Hexyl diglycol | | | |
|  | Silicone | Silicone oil | | | |
|  | Polymer | Polyflow No. 90 | | | |
|  | Phosphoric ester | (Isodecyl acid phosphate) | | | |
|  |  | Total | 100 | 100 | 100 |
|  |  | (a)/(c) | 0.192 | 0.274 | 0.400 |
| Property |  | Softening point | B | B | B |
|  |  | Viscosity (Pa · s) | 3500 | 3500 | 3500 |
| Solder processing Evaluation |  | Solder composition | Sn—Ag—Cu | Sn—Ag—Cu | Sn—Ag—Cu |
|  |  | Residue crack resistance | A | A | A |
|  |  | Processability (suitable for application) | B | B | B |
|  |  | Wettability | B | B | B |

|  |  |  | Example 11 | Example 12 | Example 13 |
|---|---|---|---|---|---|
| Rosin | (a) | Hydrogenated rosin methyl ester | 1 | 5 | 8 |
|  | (b) | Rosin ester | | | |
|  |  | Polymerized rosin ester | | | |
|  |  | Hydrogenated rosin ester | | | |

TABLE 1-continued

| | | | | | |
|---|---|---|---|---|---|
| | (c) | Natural rosin | | | |
| | | Polymerized rosin | | | |
| | | Hydrogenated rosin | 98.9 | 65 | 90 |
| | | Acid-modified rosin | | | |
| | | Hydrogenated polymerized rosin | | | |
| | | Hydrogenated acid-modified rosin | | | |
| | | Disproportionated rosin | | | |
| Activator | Organic acid | Glutaric acid | 0.1 | 2 | 2 |
| | | Adipic acid | | 2 | |
| | | Stearic acid | | 10 | |
| | | 12-Hydroxystearic acid | | 10 | |
| | Amine | CUREZOL C11Z (imidazole) | | | 2 |
| | | 2-Phenylimidazole | | | |
| | | Diphenylguanidine | | | |
| | Amine hydrohalogenic acid salt | 2PI. HBr | | 2 | |
| | | Diphenylguanidine HBr | | | |
| | | 2-Pipecoline HBr | | | |
| | | N,N-diethylaniline · HBr salt | | | |
| | Halogen | 2,2,2-Tribromoethanol | | 2 | |
| | | n-DBBD | | | |
| | | tra-DBBD | | | |
| | | Tetrabromoethane | | | |
| | | Tetrabromobutane | | | |
| | | Triallyl isocyanurate hexabromide | | | |
| Others | Solvent | Hexyl diglycol | | | |
| | Silicone | Silicone oil | | | |
| | Polymer | Polyflow No. 90 | | | |
| | Phosphoric ester | (Isodecyl acid phosphate) | | | |
| | Total | | 100 | 100 | 100 |
| | (a)/(c) | | 0.010 | 0.077 | 0.089 |
| Property | | Softening point | B | B | B |
| | | Viscosity (Pa · s) | 3500 | 3500 | 3500 |
| Solder processing Evaluation | | Solder composition | Sn—Ag—Cu | Sn—Ag—Cu | Sn—Ag—Cu |
| | | Residue crack resistance | B | A | A |
| | | Processability (suitable for application) | B | B | B |
| | | Wettability | B | B | B |

TABLE 2

| | | | Example 14 | Example 15 | Example 16 | Example 17 |
|---|---|---|---|---|---|---|
| Rosin | (a) | Hydrogenated rosin methyl ester | 8 | 8 | 8 | 8 |
| | (b) | Rosin ester | | | | |
| | | Polymerized rosin ester | | | | |
| | | Hydrogenated rosin ester | | | | |
| | (c) | Natural rosin | | | | |
| | | Polymerized rosin | | | | |
| | | Hydrogenated rosin | 90 | 90 | 90 | 90 |
| | | Acid-modified rosin | | | | |
| | | Hydrogenated polymerized rosin | | | | |
| | | Hydrogenated acid-modified rosin | | | | |
| | | Disproportionated rosin | | | | |
| Activator | Organic acid | Glutaric acid | | | | |
| | | Adipic acid | 2 | | | |
| | | Stearic acid | | 2 | | |
| | | 12-Hydroxystearic acid | | | 2 | |
| | Amine | CUREZOL C11Z (imidazole) | | | | 2 |
| | | 2-Phenylimidazole | | | | |
| | | Diphenylguanidine | | | | |
| | Amine hydrohalogenic acid salt | 2PI. HBr | | | | |
| | | Diphenylguanidine HBr | | | | |
| | | 2-Pipecoline HBr | | | | |
| | | N,N-diethylaniline · HBr salt | | | | |
| | Halogen | 2,2,2-Tribromoethanol | | | | |
| | | n-DBBD | | | | |
| | | tra-DBBD | | | | |
| | | Tetrabromoethane | | | | |
| | | Tetrabromobutane | | | | |
| | | Triallyl isocyanurate hexabromide | | | | |

TABLE 2-continued

| | | | | | | |
|---|---|---|---|---|---|---|
| Others | Solvent | Hexyl diglycol | | | | |
| | Silicone | Silicone oil | | | | |
| | Polymer | Polyflow No. 90 | | | | |
| | Phosphoric ester | (Isodecyl acid phosphate) | | | | |
| | | Total | 100 | 100 | 100 | 100 |
| | | (a)/(c) | 0.089 | 0.089 | 0.089 | 0.089 |
| Property | | Softening point | B | B | B | B |
| | | Viscosity (Pa·s) | 3500 | 3500 | 3500 | 3500 |
| Solder processing Evaluation | | Solder composition | Sn—Ag—Cu | Sn—Ag—Cu | Sn—Ag—Cu | Sn—Ag—Cu |
| | | Residue crack resistance | A | A | A | A |
| | | Processability (suitable for application) | B | B | B | B |
| | | Wettability | B | B | B | B |

| | | | Example 18 | Example 19 | Example 20 |
|---|---|---|---|---|---|
| Rosin | (a) | Hydrogenated rosin methyl ester | 8 | 8 | 8 |
| | (b) | Rosin ester | | | |
| | | Polymerized rosin ester | | | |
| | | Hydrogenated rosin ester | | | |
| | (c) | Natural rosin | | | |
| | | Polymerized rosin | | | |
| | | Hydrogenated rosin | 90 | 90 | 90 |
| | | Acid-modified rosin | | | |
| | | Hydrogenatedpolymerized rosin | | | |
| | | Hydrogenated acid-modified rosin | | | |
| | | Disproportionated rosin | | | |
| Activator | Organic acid | Glutaric acid | | | |
| | | Adipic acid | | | |
| | | Stearic acid | | | |
| | | 12-Hydroxystearic acid | | | |
| | Amine | CUREZOL C11Z (imidazole) | | | |
| | | 2-Phenylimidazole | 2 | | |
| | | Diphenylguanidine | | 2 | |
| | Amine hydrohalogenic acid salt | 2PI. HBr | | | |
| | | Diphenylguanidine HBr | | | |
| | | 2-Pipecoline HBr | | | |
| | | N,N-diethylaniline · HBr salt | | | |
| | Halogen | 2,2,2-Tribromoethanol | | | 2 |
| | | n-DBBD | | | |
| | | tra-DBBD | | | |
| | | Tetrabromoethane | | | |
| | | Tetrabromobutane | | | |
| | | Triallyl isocyanurate hexabromide | | | |
| Others | Solvent | Hexyl diglycol | | | |
| | Silicone | Silicone oil | | | |
| | Polymer | Polyflow No. 90 | | | |
| | Phosphoric ester | (Isodecyl acid phosphate) | | | |
| | | Total | 100 | 100 | 100 |
| | | (a)/(c) | 0.089 | 0.089 | 0.089 |
| Property | | Softening point | B | B | B |
| | | Viscosity (Pa·s) | 3500 | 3500 | 3500 |
| Solder processing Evaluation | | Solder composition | Sn—Ag—Cu | Sn—Ag—Cu | Sn—Ag—Cu |
| | | Residue crack resistance | A | A | A |
| | | Processability (suitable for application) | B | B | B |
| | | Wettability | B | B | B |

| | | | Example 21 | Example 22 | Example 23 |
|---|---|---|---|---|---|
| Rosin | (a) | Hydrogenated rosin methyl ester | 8 | 8 | 8 |
| | (b) | Rosin ester | | | |
| | | Polymerized rosin ester | | | |
| | | Hydrogenated rosin ester | | | |
| | (c) | Natural rosin | | | |
| | | Polymerized rosin | | | |
| | | Hydrogenated rosin | 90 | 90 | 90 |
| | | Acid-modified rosin | | | |
| | | Hydrogenatedpolymerized rosin | | | |
| | | Hydrogenated acid-modified rosin | | | |
| | | Disproportionated rosin | | | |

TABLE 2-continued

| | | | | | |
|---|---|---|---|---|---|
| Activator | Organic acid | Glutaric acid | | | |
| | | Adipic acid | | | |
| | | Stearic acid | | | |
| | | 12-Hydroxystearic acid | | | |
| | Amine | CUREZOL C11Z (imidazole) | | | |
| | | 2-Phenylimidazole | | | |
| | | Diphenylguanidine | | | |
| | Amine hydrohalogenic acid salt | 2PI. HBr | 2 | | |
| | | Diphenylguanidine HBr | | | |
| | | 2-Pipecoline HBr | | 2 | |
| | | N,N-diethylaniline · HBr salt | | | 2 |
| | Halogen | 2,2,2-Tribromoethanol | | | |
| | | n-DBBD | | | |
| | | tra-DBBD | | | |
| | | Tetrabromoethane | | | |
| | | Tetrabromobutane | | | |
| | | Triallyl isocyanurate hexabromide | | | |
| Others | Solvent | Hexyl diglycol | | | |
| | Silicone | Silicone oil | | | |
| | Polymer | Polyflow No. 90 | | | |
| | Phosphoric ester | (Isodecyl acid phosphate) | | | |
| | | Total | 100 | 100 | 100 |
| | | (a)/(c) | 0.089 | 0.089 | 0.089 |
| Property | | Softening point | B | B | B |
| | | Viscosity (Pa · s) | 3500 | 3500 | 3500 |
| Solder processing Evaluation | | Solder composition | Sn—Ag—Cu | Sn—Ag—Cu | Sn—Ag—Cu |
| | | Residue crack resistance | A | A | A |
| | | Processability (suitable for application) | B | B | B |
| | | Wettability | B | B | B |

| | | | Example 24 | Example 25 | Example 26 |
|---|---|---|---|---|---|
| Rosin | (a) | Hydrogenated rosin methyl ester | 8 | 8 | 8 |
| | (b) | Rosin ester | | | |
| | | Polymerized rosin ester | | | |
| | | Hydrogenated rosin ester | | | |
| | (c) | Natural rosin | | | |
| | | Polymerized rosin | | | |
| | | Hydrogenated rosin | 90 | 90 | 90 |
| | | Acid-modified rosin | | | |
| | | Hydrogenatedpolymerized rosin | | | |
| | | Hydrogenated acid-modified rosin | | | |
| | | Disproportionated rosin | | | |
| Activator | Organic acid | Glutaric acid | | | |
| | | Adipic acid | | | |
| | | Stearic acid | | | |
| | | 12-Hydroxystearic acid | | | |
| | Amine | CUREZOL C11Z (imidazole) | | | |
| | | 2-Phenylimidazole | | | |
| | | Diphenylguanidine | | | |
| | Amine hydrohalogenic acid salt | 2PI. HBr | | | |
| | | Diphenylguanidine HBr | | | |
| | | 2-Pipecoline HBr | | | |
| | | N,N-diethylaniline · HBr salt | | | |
| | Halogen | 2,2,2-Tribromoethanol | 2 | | |
| | | n-DBBD | | 2 | |
| | | tra-DBBD | | | 2 |
| | | Tetrabromoethane | | | |
| | | Tetrabromobutane | | | |
| | | Triallyl isocyanurate hexabromide | | | |
| Others | Solvent | Hexyl diglycol | | | |
| | Silicone | Silicone oil | | | |
| | Polymer | Polyflow No. 90 | | | |
| | Phosphoric ester | (Isodecyl acid phosphate) | | | |
| | | Total | 100 | 100 | 100 |
| | | (a)/(c) | 0.089 | 0.089 | 0.089 |
| Property | | Softening point | B | B | B |
| | | Viscosity (Pa · s) | 3500 | 3500 | 3500 |

TABLE 2-continued

| Solder processing Evaluation | Solder composition | Sn—Ag—Cu | Sn—Ag—Cu | Sn—Ag—Cu |
|---|---|---|---|---|
| | Residue crack resistance | A | A | A |
| | Processability (suitable for application) | B | B | B |
| | Wettability | B | B | B |

TABLE 3

| | | | Example 27 | Example 28 | Example 29 | Example 30 |
|---|---|---|---|---|---|---|
| Rosin | (a) | Hydrogenated rosin methyl ester | 8 | 8 | 8 | 3 |
| | (b) | Rosin ester | | | | |
| | | Polymerized rosin ester | | | | |
| | | Hydrogenated rosin ester | | | | |
| | (c) | Natural rosin | | | | |
| | | Polymerized rosin | | | | |
| | | Hydrogenated rosin | 90 | 90 | 90 | 87.5 |
| | | Acid-modified rosin | | | | |
| | | Hydrogenatedpolymerized rosin | | | | |
| | | Hydrogenated acid-modified rosin | | | | |
| | | Disproportionated rosin | | | | |
| Activator | Organic acid | Glutaric acid | | | | |
| | | Adipic acid | | | | 1 |
| | | Stearic acid | | | | |
| | | 12-Hydroxystearic acid | | | | |
| | Amine | CUREZOL C11Z (imidazole) | | | | |
| | | 2-Phenylimidazole | | | | |
| | | Diphenylguanidine | | | | 2 |
| | Amine hydrohalogenic acid salt | 2PI · HBr | | | | |
| | | Diphenylguanidine HBr | | | | 0.5 |
| | | 2-Pipecoline HBr | | | | |
| | | N,N-diethylaniline · HBr salt | | | | |
| | Halogen | 2,2,2-Tribromoethanol | | | | |
| | | n-DBBD | | | | |
| | | tra-DBBD | | | | 6 |
| | | Tetrabromoethane | 2 | | | |
| | | Tetrabromobutane | | 2 | | |
| | | Triallyl isocyanurate hexabromide | | | 2 | |
| Others | Solvent | Hexyl diglycol | | | | |
| | Silicone | Silicone oil | | | | |
| | Polymer | Polyflow No. 90 | | | | |
| | Phosphoric ester | (Isodecyl acid phosphate) | | | | |
| | | Total | 100 | 100 | 100 | 100 |
| | | (a)/(c) | 0.089 | 0.089 | 0.089 | 0.034 |
| Property | | Softening point | B | B | B | B |
| | | Viscosity (Pa · s) | 3500 | 3500 | 3500 | 3500 |
| Solder processing Evaluation | | Solder composition | Sn—Ag—Cu | Sn—Ag—Cu | Sn—Ag—Cu | Sn—Ag—Cu |
| | | Residue crack resistance | A | A | A | A |
| | | Processability (suitable for application) | B | B | B | B |
| | | Wettability | B | B | B | B |

| | | | Example 31 | Example 32 | Example 33 |
|---|---|---|---|---|---|
| Rosin | (a) | Hydrogenated rosin methyl ester | 3 | 3 | 5 |
| | (b) | Rosin ester | | | |
| | | Polymerized rosin ester | | | |
| | | Hydrogenated rosin ester | | | |
| | (c) | Natural rosin | | | |
| | | Polymerized rosin | | | |
| | | Hydrogenated rosin | 88 | 90 | 85.5 |
| | | Acid-modified rosin | | | |
| | | Hydrogenatedpolymerized rosin | | | |
| | | Hydrogenated acid-modified rosin | | | |
| | | Disproportionated rosin | | | |
| Activator | Organic acid | Glutaric acid | | 1 | |
| | | Adipic acid | 1 | | 1 |
| | | Stearic acid | | | |
| | | 12-Hydroxystearic acid | | | |

TABLE 3-continued

|  |  |  |  |  |  |
|---|---|---|---|---|---|
| | Amine | CUREZOL C11Z (imidazole) | | 2 | |
| | | 2-Phenylimidazole | 2 | | |
| | | Diphenylguanidine | | | 2 |
| | Amine hydrohalogenic acid salt | 2PI. HBr | | 2 | |
| | | Diphenylguanidine HBr | | | 0.5 |
| | | 2-Pipecoline HBr | | | |
| | | N,N-diethylaniline · HBr salt | 2 | | |
| | Halogen | 2,2,2-Tribromoethanol | 2 | 2 | |
| | | n-DBBD | 2 | | |
| | | tra-DBBD | | | 6 |
| | | Tetrabromoethane | | | |
| | | Tetrabromobutane | | | |
| | | Triallyl isocyanurate hexabromide | | | |
| Others | Solvent | Hexyl diglycol | | | |
| | Silicone | Silicone oil | | | |
| | Polymer | Polyflow No. 90 | | | |
| | Phosphoric ester | (Isodecyl acid phosphate) | | | |
| | | Total | 100 | 100 | 100 |
| | | (a)/(c) | 0.034 | 0.033 | 0.058 |
| Property | | Softening point | B | B | B |
| | | Viscosity (Pa · s) | 3500 | 3500 | 3500 |
| Solder processing Evaluation | | Solder composition | Sn—Ag—Cu | Sn—Ag—Cu | Sn—Ag—Cu |
| | | Residue crack resistance | A | A | A |
| | | Processability (suitable for application) | B | B | B |
| | | Wettability | B | B | B |

|  |  |  | Example 34 | Example 35 | Example 36 |
|---|---|---|---|---|---|
| Rosin | (a) | Hydrogenated rosin methyl ester | 5 | 5 | 1 |
| | (b) | Rosin ester | | | |
| | | Polymerized rosin ester | | | |
| | | Hydrogenated rosin ester | | | |
| | (c) | Natural rosin | | | |
| | | Polymerized rosin | | | |
| | | Hydrogenated rosin | 86 | 88 | 82 |
| | | Acid-modified rosin | | | |
| | | Hydrogenatedpolymerized rosin | | | |
| | | Hydrogenated acid-modified rosin | | | |
| | | Disproportionated rosin | | | |
| Activator | Organic acid | Glutaric acid | | 1 | 1 |
| | | Adipic acid | 1 | | 1 |
| | | Stearic acid | | | 1 |
| | | 12-Hydroxystearic acid | | | 1 |
| | Amine | CUREZOL C11Z (imidazole) | | 2 | 1 |
| | | 2-Phenylimidazole | 2 | | 1 |
| | | Diphenylguanidine | | | 1 |
| | Amine hydrohalogenic acid salt | 2PI. HBr | | 2 | 1 |
| | | Diphenylguanidine HBr | | | 1 |
| | | 2-Pipecoline HBr | | | 1 |
| | | N,N-diethylaniline · HBr salt | 2 | | 1 |
| | Halogen | 2,2,2-Tribromoethanol | 2 | 2 | 1 |
| | | n-DBBD | 2 | | 1 |
| | | tra-DBBD | | | 1 |
| | | Tetrabromoethane | | | 1 |
| | | Tetrabromobutane | | | 1 |
| | | Triallyl isocyanurate hexabromide | | | 1 |
| Others | Solvent | Hexyl diglycol | | | |
| | Silicone | Silicone oil | | | |
| | Polymer | Polyflow No. 90 | | | |
| | Phosphoric ester | (Isodecyl acid phosphate) | | | |
| | | Total | 100 | 100 | 100 |
| | | (a)/(c) | 0.058 | 0.057 | 0.012 |
| Property | | Softening point | B | B | B |
| | | Viscosity (Pa · s) | 3500 | 3500 | 3500 |
| Solder processing Evaluation | | Solder composition | Sn—Ag—Cu | Sn—Ag—Cu | Sn—Ag—Cu |
| | | Residue crack resistance | A | A | B |
| | | Processability (suitable for application) | B | B | B |
| | | Wettability | B | B | B |

TABLE 3-continued

|  |  |  | Example 37 | Example 38 | Example 39 |
|---|---|---|---|---|---|
| Rosin | (a) | Hydrogenated rosin methyl ester | 7 | 5 | 5 |
|  | (b) | Rosin ester |  |  |  |
|  |  | Polymerized rosin ester |  |  |  |
|  |  | Hydrogenated rosin ester |  |  |  |
|  | (c) | Natural rosin |  |  |  |
|  |  | Polymerized rosin |  |  |  |
|  |  | Hydrogenated rosin | 70 | 78 | 87 |
|  |  | Acid-modified rosin |  |  |  |
|  |  | Hydrogenatedpolymerized rosin |  |  |  |
|  |  | Hydrogenated acid-modified rosin |  |  |  |
|  |  | Disproportionated rosin |  |  |  |
| Activator | Organic acid | Glutaric acid | 1 |  |  |
|  |  | Adipic acid | 1 | 1 | 1 |
|  |  | Stearic acid | 1 |  |  |
|  |  | 12-Hydroxystearic acid | 1 |  |  |
|  | Amine | CUREZOL C11Z (imidazole) | 1 |  |  |
|  |  | 2-Phenylimidazole | 1 | 2 | 2 |
|  |  | Diphenylguanidine | 1 |  |  |
|  | Amine hydrohalogenic acid salt | 2PI. HBr | 1 |  |  |
|  |  | Diphenylguanidine HBr | 1 | 2 | 2 |
|  |  | 2-Pipecoline HBr | 1 |  |  |
|  |  | N,N-diethylaniline · HBr salt | 1 |  |  |
|  | Halogen | 2,2,2-Tribromoethanol | 1 | 2 | 2 |
|  |  | n-DBBD | 1 |  |  |
|  |  | tra-DBBD | 1 |  |  |
|  |  | Tetrabromoethane | 1 |  |  |
|  |  | Tetrabromobutane | 1 |  |  |
|  |  | Triallyl isocyanurate hexabromide | 1 |  |  |
| Others | Solvent | Hexyl diglycol | 3 | 10 |  |
|  | Silicone | Silicone oil | 1 |  | 1 |
|  | Polymer | Polyflow No. 90 | 1 |  |  |
|  | Phosphoric ester | (Isodecyl acid phosphate) | 1 |  |  |
|  |  | Total | 100 | 100 | 100 |
|  |  | (a)/(c) | 0.100 | 0.064 | 0.057 |
| Property |  | Softening point | B | B | B |
|  |  | Viscosity (Pa · s) | 3500 | 3500 | 3500 |
| Solder processing |  | Solder composition | Sn—Ag—Cu | Sn—Ag—Cu | Sn—Ag—Cu |
| Evaluation |  | Residue crack resistance | A | A | A |
|  |  | Processability (suitable for application) | B | B | B |
|  |  | Wettability | B | B | B |

TABLE 4

|  |  |  | Example 40 | Example 41 | Example 42 | Example 43 |
|---|---|---|---|---|---|---|
| Rosin | (a) | Hydrogenated rosin methyl ester | 5 | 5 | 5 | 5 |
|  | (b) | Rosin ester |  |  |  |  |
|  |  | Polymerized rosin ester |  |  |  |  |
|  |  | Hydrogenated rosin ester |  |  |  |  |
|  | (c) | Natural rosin |  |  |  |  |
|  |  | Polymerized rosin |  |  |  |  |
|  |  | Hydrogenated rosin | 87 | 87 | 80 | 88 |
|  |  | Acid-modified rosin |  |  |  |  |
|  |  | Hydrogenatedpolymerized rosin |  |  |  |  |
|  |  | Hydrogenated acid-modified rosin |  |  |  |  |
|  |  | Disproportionated rosin |  |  |  |  |
| Activator | Organic acid | Glutaric acid |  |  |  |  |
|  |  | Adipic acid | 1 | 1 | 1 | 1 |
|  |  | Stearic acid |  |  |  |  |
|  |  | 12-Hydroxystearic acid |  |  |  |  |
|  | Amine | CUREZOL C11Z (imidazole) |  |  |  |  |
|  |  | 2-Phenylimidazole | 2 | 2 | 2 | 2 |
|  |  | Diphenylguanidine |  |  |  |  |
|  | Amine hydrohalogenic acid salt | 2PI. HBr |  |  |  |  |
|  |  | Diphenylguanidine HBr | 2 | 2 | 2 | 2 |
|  |  | 2-Pipecoline HBr |  |  |  |  |
|  |  | N,N-diethylaniline · HBr salt |  |  |  |  |

TABLE 4-continued

|  |  |  |  |  |  |  |
|---|---|---|---|---|---|---|
| | Halogen | 2,2,2-Tribromoethanol | 2 | 2 | 2 | 2 |
| | | n-DBBD | | | | |
| | | tra-DBBD | | | | |
| | | Tetrabromoethane | | | | |
| | | Tetrabromobutane | | | | |
| | | Triallyl isocyanurate hexabromide | | | | |
| Others | Solvent | Hexyl diglycol | | | 5 | |
| | Silicone | Silicone oil | | | 1 | |
| | Polymer | Polyflow No. 90 | 1 | | 1 | 1 |
| | Phosphoric ester | (Isodecyl acid phosphate) | | 1 | 1 | |
| | | Total | 100 | 100 | 100 | 100 |
| | | (a)/(c) | 0.057 | 0.057 | 0.063 | 0.057 |
| Property | | Softening point | B | B | B | B |
| | | Viscosity (Pa · s) | 3500 | 3500 | 3500 | 3500 |
| Solder processing Evaluation | | Solder composition | Sn—Ag—Cu | Sn—Ag—Cu | Sn—Ag—Cu | Sn—Bi |
| | | Residue crack resistance | A | A | A | A |
| | | Processability (suitable for application) | B | B | B | B |
| | | Wettability | B | B | B | B |

| | | | Example 44 | Example 45 | Example 46 | Example 47 |
|---|---|---|---|---|---|---|
| Rosin | (a) | Hydrogenated rosin methyl ester | 5 | 5 | 0.5 | 20 |
| | (b) | Rosin ester | | | | |
| | | Polymerized rosin ester | | | | |
| | | Hydrogenated rosin ester | | | | |
| | (c) | Natural rosin | | | 92.5 | |
| | | Polymerized rosin | | | | |
| | | Hydrogenated rosin | 88 | 88 | | 73 |
| | | Acid-modified rosin | | | | |
| | | Hydrogenatedpolymerized rosin | | | | |
| | | Hydrogenated acid-modified rosin | | | | |
| | | Disproportionated rosin | | | | |
| Activator | Organic acid | Glutaric acid | | | | |
| | | Adipic acid | 1 | 1 | 1 | 1 |
| | | Stearic acid | | | | |
| | | 12-Hydroxystearic acid | | | | |
| | Amine | CUREZOL C11Z (imidazole) | | | | |
| | | 2-Phenylimidazole | 2 | 2 | 2 | 2 |
| | | Diphenylguanidine | | | | |
| | Amine hydrohalogenic acid salt | 2PI. HBr | | | | |
| | | Diphenylguanidine HBr | 2 | 2 | 2 | 2 |
| | | 2-Pipecoline HBr | | | | |
| | | N,N-diethylaniline · HBr salt | | | | |
| | Halogen | 2,2,2-Tribromoethanol | 2 | 2 | 2 | 2 |
| | | n-DBBD | | | | |
| | | tra-DBBD | | | | |
| | | Tetrabromoethane | | | | |
| | | Tetrabromobutane | | | | |
| | | Triallyl isocyanurate hexabromide | | | | |
| Others | Solvent | Hexyl diglycol | | | | |
| | Silicone | Silicone oil | | | | |
| | Polymer | Polyflow No. 90 | | | | |
| | Phosphoric ester | (Isodecyl acid phosphate) | | | | |
| | | Total | 100 | 100 | 100 | 100 |
| | | (a)/(c) | 0.057 | 0.057 | 0.005 | 0.274 |
| Property | | Softening point | B | B | B | B |
| | | Viscosity (Pa · s) | 3500 | 3500 | 3500 | 3500 |
| Solder processing Evaluation | | Solder composition | Sn—Cu | Sn—Ag | Sn—Ag—Cu | Sn—Ag—Cu |
| | | Residue crack resistance | A | A | C | A |
| | | Processability (suitable for application) | B | B | B | B |
| | | Wettability | B | B | B | B |

| | | | Comparative Example 1 | Comparative Example 2 | Comparative Example 3 | Comparative Example 4 |
|---|---|---|---|---|---|---|
| Rosin | (a) | Hydrogenated rosin methyl ester | 30 | 0 | 90 | 20 |
| | (b) | Rosin ester | | | | |
| | | Polymerized rosin ester | | | | |
| | | Hydrogenated rosin ester | | | | |

TABLE 4-continued

| | | | | | | |
|---|---|---|---|---|---|---|
| Activator | (c) | Natural rosin | | | | |
| | | Polymerized rosin | | | | |
| | | Hydrogenated rosin | | | | |
| | | Acid-modified rosin | | | | |
| | | Hydrogenated polymerized rosin | 60 | 93 | 0 | 49 |
| | | Hydrogenated acid-modified rosin | | | | |
| | | Disproportionated rosin | | | | |
| | Organic acid | Glutaric acid | | | 10 | 31 |
| | | Adipic acid | 1 | 1 | | |
| | | Stearic acid | 3 | | | |
| | | 12-Hydroxystearic acid | | | | |
| | Amine | CUREZOL C11Z (imidazole) | | | | |
| | | 2-Phenylimidazole | 2 | 2 | | |
| | | Diphenylguanidine | | | | |
| | Amine hydrohalogenic acid salt | 2PI. HBr | | | | |
| | | Diphenylguanidine HBr | 2 | 2 | | |
| | | 2-Pipecoline HBr | | | | |
| | | N,N-diethylaniline · HBr salt | | | | |
| | Halogen | 2,2,2-Tribromoethanol | 2 | 2 | | |
| | | n-DBBD | | | | |
| | | tra-DBBD | | | | |
| | | Tetrabromoethane | | | | |
| | | Tetrabromobutane | | | | |
| | | Triallyl isocyanurate hexabromide | | | | |
| Others | Solvent | Hexyl diglycol | | | | |
| | Silicone | Silicone oil | | | | |
| | Polymer | Polyflow No. 90 | | | | |
| | Phosphoric ester | (Isodecyl acid phosphate) | | | | |
| | | Total | 100 | 100 | 100 | 100 |
| | | (a)/(c) | 0.368 | 0.000 | | 0.408 |
| Property | | Softening point | D | B | D | D |
| | | Viscosity (Pa·s) | 2800 | 3500 | 7 | 2400 |
| Solder processing Evaluation | | Solder composition | Sn—Ag—Cu | Sn—Ag—Cu | Sn—Ag—Cu | Sn—Ag—Cu |
| | | Residue crack resistance | — | D | — | — |
| | | Processability (suitable for application) | D | B | D | D |
| | | Wettability | — | B | — | — |

This application is based upon and claims the benefit of priority from Japanese Patent Application No. 2020-059856, filed Mar. 30, 2020, the entire contents of which are incorporated herein by reference.

The invention claimed is:

1. A flux comprising:
a rosin methyl ester,
an unesterified rosin and,
an activator which includes an organic halogen compound activator,
wherein a content of the rosin methyl ester is 0.5% to 20% by mass with respect to a total mass of the flux,
wherein a content of the unesterified rosin is 73% to 98.9% by mass with respect to the total mass of the flux,
wherein the flux is solid at 25° C. or is solid-like having a viscosity $\eta_1$ at 25° C. of 3,200 Pa·s or more when the viscosity is measured by the steps comprising:
sandwiching the flux between parallel flat plates of a rheometer and deforming by narrowing a space between the parallel flat plates while heating at 100° C.
thereby forming a thin sample of the flux having a thickness of 0.5 mm,
cooling the thin sample to 25° C.,
rotating the parallel flat plates of the rheometer at 6 Hz;
measuring the viscosity $\eta_1$ at 25° C. 5 minutes after rotating parallel flat plates; and
wherein the flux is used for an inside of a flux-cored solder or an exterior of a flux-coated solder.

2. The flux according to claim 1,
wherein the rosin methyl ester is one or more methyl ester products selected from a group consisting of a natural rosin, a hydrogenated rosin, a polymerized rosin, a disproportionated rosin, an acid-modified rosin, a hydrogenated polymerized rosin, and a hydrogenated acid-modified rosin.

3. The flux according to claim 1,
wherein the flux has a softening point of 28° C. to 100° C. in accordance with JIS K 5902-1969.

4. The flux according to claim 1,
wherein the rosin methyl ester is a liquid at 25° C.

5. The flux according to claim 1, further comprising a solvent, wherein a content of the solvent is 13% by mass or less with respect to a total mass of the flux.

6. The flux according to claim 1, is not a paste.

7. A method for using the flux according to claim 1, comprising manufacturing a flux-cored solder or a flux-coated solder by including the flux.

8. The flux according to claim 1,
wherein the organic halogen compound activator includes trans-2,3-dibromo-2-butene-1,4-diol, 2,3-dibromo-1,4-butanediol, 2,3-dibromo-1-propanol, 2,3-dichloro-1-propanol, 1,1,2,2-tetrabromoethane, 2,2,2-tribromoethanol, pentabromoethane, carbon tetrabromide, 2,2-bis(bromomethyl)-1,3-propanediol, meso-2,3-Dibromo-succinic, chloroalkane, a chlorinated fatty acid ester, n-hexadecyltrimethylammonium bromide, triallyl isocyanurate hexabromide, 2,2-bis[3,5-dibromo-4-(2,3-dibromopropoxy)phenyl]propane, bis[3,5-dibromo-4-(2,3-dibromopropoxy)phenyl]sulfone, ethylenebispentabromobenzene, 2-chloromethyloxirane, HET acid, HET anhydride, or brominated bisphenol A epoxy resin.

9. The flux according to claim 1, wherein the flux does not include any solvent.

10. The flux according to claim 1, wherein the flux is solid at 25° C.

11. A flux-cored solder comprising,
a solder alloy, and
the flux according to claim 1, filled into the solder alloy.

12. The flux-cored solder according to claim 11, wherein the flux does not include any solvent.

13. A flux-coated solder comprising
a solder alloy having a predetermined shape, and
the flux according to claim 1 coated on an outer surface of the solder alloy.

14. The flux-coated solder according to claim 13, wherein the flux does not include any solvent.

15. A soldering method comprising performing soldering with the flux according to claim 1.

* * * * *